(12) United States Patent
Thomas (10) Patent No.: US 6,390,564 B1
(45) Date of Patent: May 21, 2002

(54) PNEUMATIC TIRE WHEEL ASSEMBLY FOR TRACKED VEHICLE

(75) Inventor: Richard Alan Thomas, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/705,535

(22) Filed: Nov. 3, 2000

(51) Int. Cl.[7] .............................................. B60B 25/00
(52) U.S. Cl. ..................................... 301/13.2; 301/36.1
(58) Field of Search ............................. 301/13.1, 13.2, 301/36.1, 36.2, 36.3

(56) References Cited

U.S. PATENT DOCUMENTS

| | | | | |
|---|---|---|---|---|
| 1,792,807 A | * | 2/1931 | Brunner | 301/13.2 |
| 1,923,811 A | * | 8/1933 | Burger | 301/13.2 |
| 1,925,598 A | * | 9/1933 | Nelson | 301/13.2 |
| 1,999,028 A | * | 4/1935 | Acton | 301/13.2 |
| 2,106,135 A | | 1/1938 | Henry | 301/52 |
| 2,152,757 A | * | 4/1939 | Burger | 301/13.2 |
| 2,663,592 A | * | 12/1953 | Swain | 301/13.2 |
| 2,967,075 A | | 1/1961 | Christie | 305/56 |
| 3,468,584 A | * | 9/1969 | Tantlinger | 301/13.2 |
| 3,913,981 A | | 10/1975 | Hunden | 301/36 R |
| 4,427,237 A | | 1/1984 | Beegle | 301/13 SM |
| 4,501,450 A | | 2/1985 | Mol | 301/13 SM |
| 4,526,425 A | * | 7/1985 | Schroeder | 301/36.1 |
| 5,046,785 A | | 9/1991 | Bockerman | 301/52 |
| 5,100,205 A | * | 3/1992 | Hardwicke | 301/36.1 |
| 5,190,363 A | | 3/1993 | Brittain et al. | 305/57 |
| 5,226,690 A | | 7/1993 | Clark et al. | 301/43 |
| 5,271,665 A | | 12/1993 | O'Coin | 301/36.3 |
| 5,352,029 A | | 10/1994 | Nagorcka | 305/39 |
| 5,899,541 A | | 5/1999 | Ying et al. | 305/115 |
| 6,030,058 A | | 2/2000 | Snyder et al. | 305/199 |

* cited by examiner

*Primary Examiner*—S. Joseph Morano
*Assistant Examiner*—Long Bao Nguyen
(74) *Attorney, Agent, or Firm*—David L King (57) ABSTRACT

A pneumatic tire wheel assembly 4 for tracked vehicles 1 has a unique rim assembly 8 for dual wheel mounting. The rim assembly has a pair of annular rims 6 connected by a plurality of laterally extending spokes 10,20 or 30. The spokes 10,20 or 30 enable mud and debris to pass preventing the accumulation of debris, mud, or snow between the wheel and the track.

1 Claim, 8 Drawing Sheets

PNEUMATIC TIRE WHEEL ASSEMBLY FOR TRACKED VEHICLE

TECHNICAL FIELD

The present invention relates to tracked vehicles for agricultural and construction vehicles and the like, more particularly a pneumatic tire wheel assembly for such tracked vehicles. The wheel assembly having a unique rim assembly for dual wheel mounting.

BACKGROUND OF THE INVENTION

The use of pneumatic tires on agricultural and construction vehicles dominates the agricultural industry as it is known today. Nevertheless, there is an increasing use of track vehicles for agricultural and construction use. These track vehicles use an endless belt, preferably made of elastomeric material reinforced by cords of steel. The belt has a ground engaging tread surface similar to that found on a tire. The primary benefit to a track system is clearly the increase flotation tracks have over tires. Tracks can bridge a longer surface area, helping to keep the vehicle afloat. In many agricultural and construction applications the use of tracked vehicles is becoming ever increasingly more popular.

In a prior art patent, U.S. Pat. No. 5,279,378 to Charles E. Grawey, et al. a frictionally driven belted work vehicle is disclosed. In that application Grawey discloses the use of a metal-coated wheel assembly having a pair of rigid wheels with a rubber coating as a drive wheel. Also a cushion wheel can be used as a drive wheel and in an alternative embodiment a bias belted pneumatic tire is used in pairs to provide a drive wheel for the belted vehicle. In that application, Grawey et al. advises that the metal or cushioned wheels are preferred over the pneumatic wheels for a variety of reasons. Grawey notes that panagraphing and relative motion between the drive wheel and the belt can not be tolerated and still provide reasonable wear. He further notes that other than the well-known panagraphing which all bias tires experience, bias tires when under load also exhibit a tracing out of the footprint for one revolution thereof which is shorter by approximately 2 or 3% than the circumference around such tires outer periphery when unloaded. Such circumferential changing phenomena causes relative motion between the belt interior surface and the drive wheel tread portions. Such motion results in wear of the leading edge of the tread lugs and, thus, reduces the tractive length of their drive portions. The practical effect of such wearing substantially reduces the wiping action of the tread lugs upon the surface of the belt which in turn reduces the friction coupling between the drive wheel structure and the belt when they are operated in mud or other adverse friction coefficient reducing requirements. Such relative bias wheel to belt movement carrying frictional engagement results in wear of the belt and the tire. The inventor then goes on to note that the lack of relative movement between the track or belt and a cushioned or rigid wheel structure greatly reduces these wear problems.

While the rigid wheels and semi-cushioned or cushioned wheels dramatically reduce the wear problems it is well-known that the vehicle suspension system must be greatly enhanced in order to provide any ride comfort. This dramatically increases the cost of the vehicle and overall the cost of operating a track vehicle system.

It is an object to the present invention to provide a pneumatic wheel assembly that does not exhibit detrimental mud and snow packing characteristics.

It is a further object of the invention that the pneumatic wheel assembly can be used which can accommodate debris and wet soil conditions while still maintain frictional engagement with the belt itself so that forward or reverse propulsion of the vehicle is not dramatically reduced due to a wet or muddy soil condition.

It is a further object of the invention to provide a dual tire rim assembly in both the drive wheel position and the free rolling axle position that avoids the potential for the track to become dislodged due to mud or debris packing.

SUMMARY OF THE INVENTION

A dual pneumatic tire rim assembly has a pair of annular rims for mounting a pair of pneumatic tires onto a tracked vehicle.

The rim assembly has a plurality of laterally extending spokes separating each annular rim by a fixed distance. Each spoke is attached to each rim. A central disk extends radially inwardly and is located between the pair of annular rims. The central disk is attached to each spoke and is located at a fixed distance O, O being the amount of offset between the vehicle axle to which the rim assembly is mounted as measured from the centerline (CL) established by the distance halfway between the pair of annular rims.

The preferred embodiment rim assembly is preferably used on tracked vehicles employing pneumatic tires in the drive wheel position and the free floating axle position, or, as in the case of skid steer equipment, an all drive wheel vehicle. (Note—skid steer vehicles have the front and rear axles on each side connected by a chain from a central drive axle. The left and right sides are independent.)

BRIEF DESCRIPTION OF THE DRAWINGS

The advantage of the present invention will be apparent from the following description when read in conjunction with the drawing in which.

DETAILED DESCRIPTION OF THE INVENTION

In a PCT Patent Publication WO-00/13921 PCT/US98/18131 entitled Pneumatic Driver Tire For Tracked Vehicle, a special pneumatic driver tire 2 is claimed. These tires 2 when sued on a tracked vehicle are mounted in pairs on rim assembly 8 as shown in FIGS. 1, 2 and FIGS. 12A, 12B marked Prior Art. This Prior Art rim assembly 8 has a cylindrical central portion 5 separating the annular rims 6. Inside the central portion 5 is welded a central disk 7 for attaching the wheel assembly 4 to a vehicle axle. The disk 7 has a large central opening 11 adapted to fit over the hub of the vehicles axle and a plurality of smaller holes 12 for fitting the stud pattern of the vehicle's hub to securely attach the wheel assembly 4 to the vehicle 100. (Note—vehicle 100 not typical of skid steer type equipment.)

Figure 1:
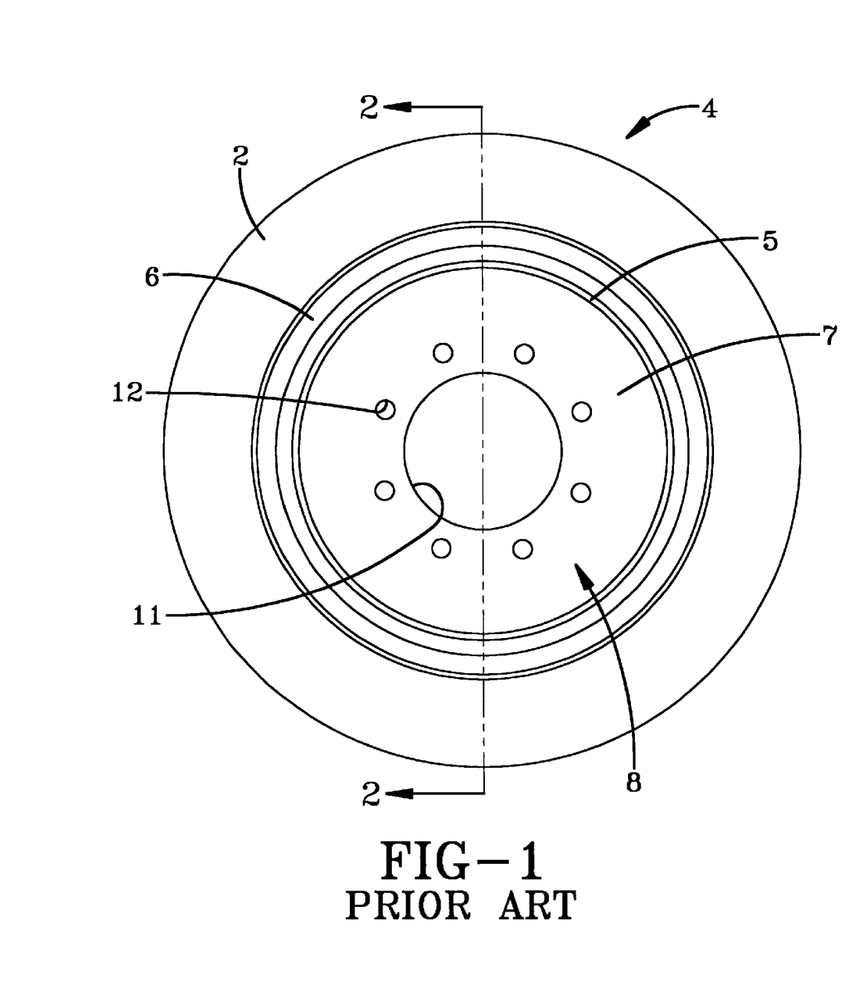
FIG. 1 is a side elevation view of the wheel assembly made in accordance to the prior art.
Figure 2:
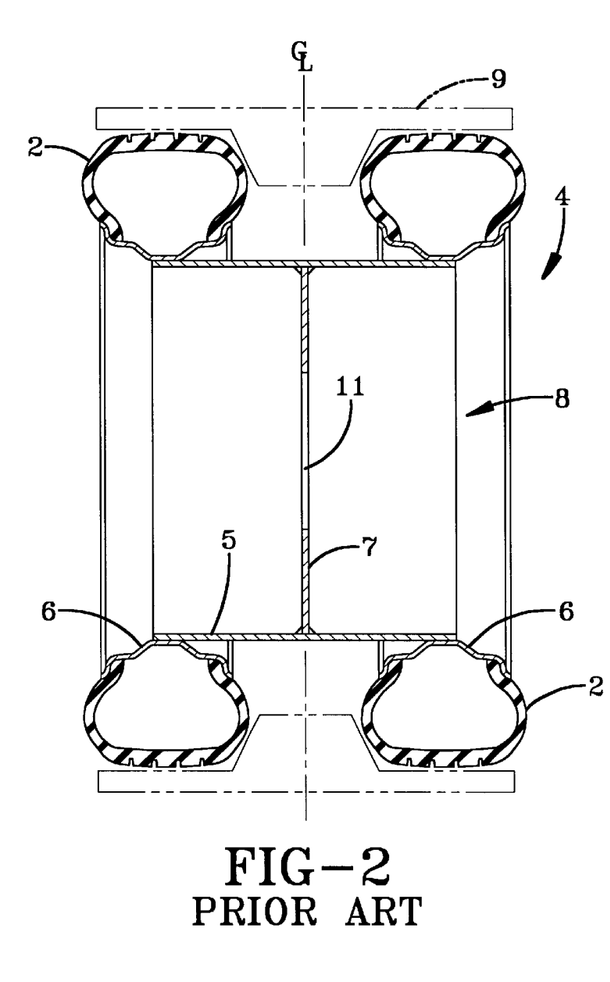
FIG. 2 is a cross-sectional view of the prior art wheel assembly of FIG. 1 taken along lines 2—2, the dashed lines represent the location where the track is positioned.

As shown in the prior art FIG. 2, the cylindrical central portion 5 is a solid tube. In use, the drive lugs 5 of the track 9 ride along the facing sides of the pair of tires 2 a small space 1 is located between the central portion 5 and track 9 and tire pairs 2,2. In certain soil conditions, soil and other debris such as small rocks get trapped in the space 1. When a sufficient amount of debris gets trapped between the track and the wheel assembly 4, the tires can be damaged and the entire track can be pushed off the wheel assembly 4.

A solution to this problem has been developed whereby the central cylindrical portion 5 of the wheel assembly 4 is replaced by a plurality of laterally extending spokes 10,20, 30 shown in FIGS. 3 through 11 of the various embodiments of the invention. These drawings show the pair of pneumatic tires 2 mounted onto the annular rims 6, as was the case in the prior art wheel assembly 4.

Figure 3:
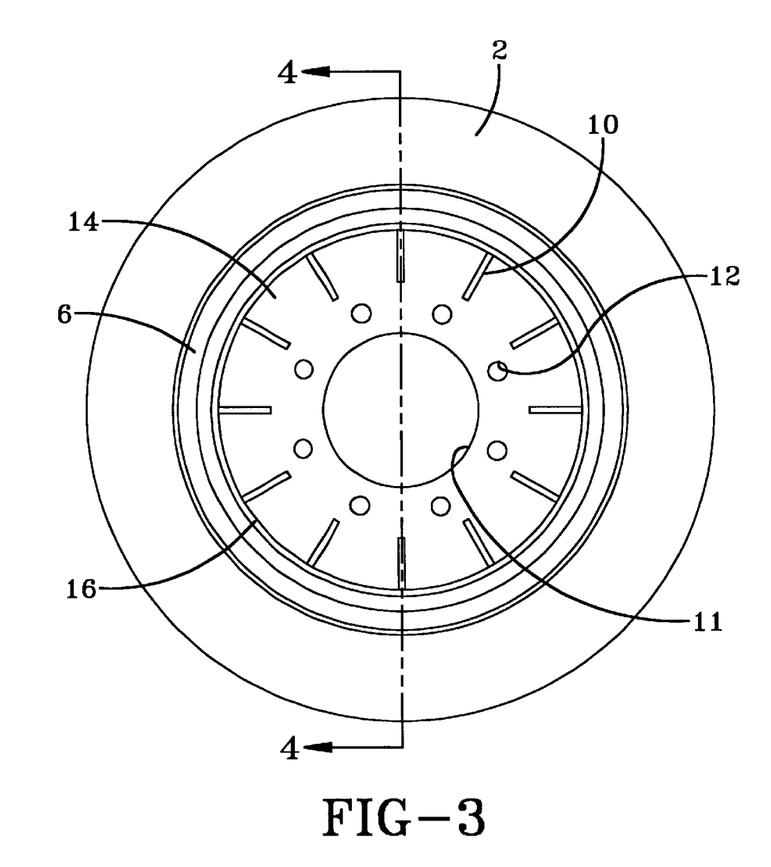
FIG. 3 is a side elevation view of the wheel assembly of the present invention.
Figure 4:
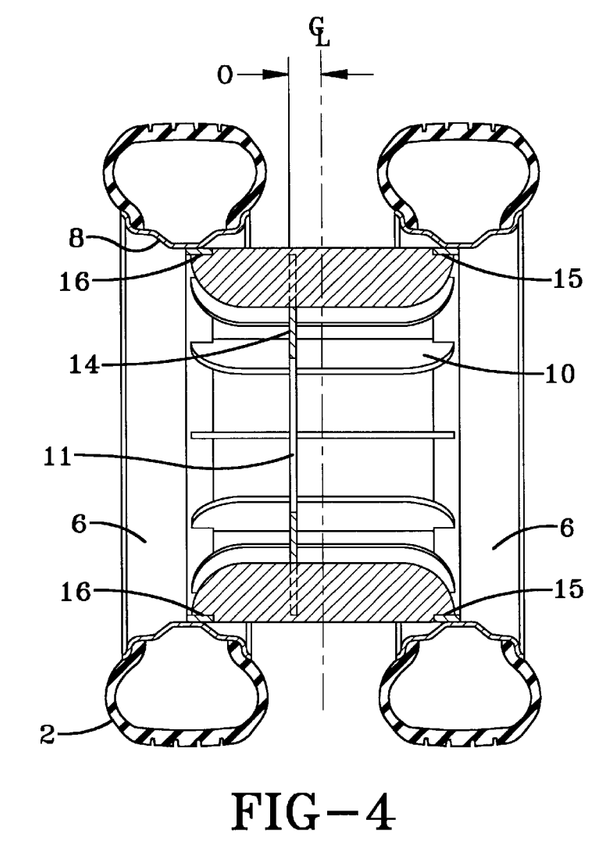
FIG. 4 is a cross-sectional view of the wheel assembly of FIG. 3 taken along lines 4—4.
Figure 5:
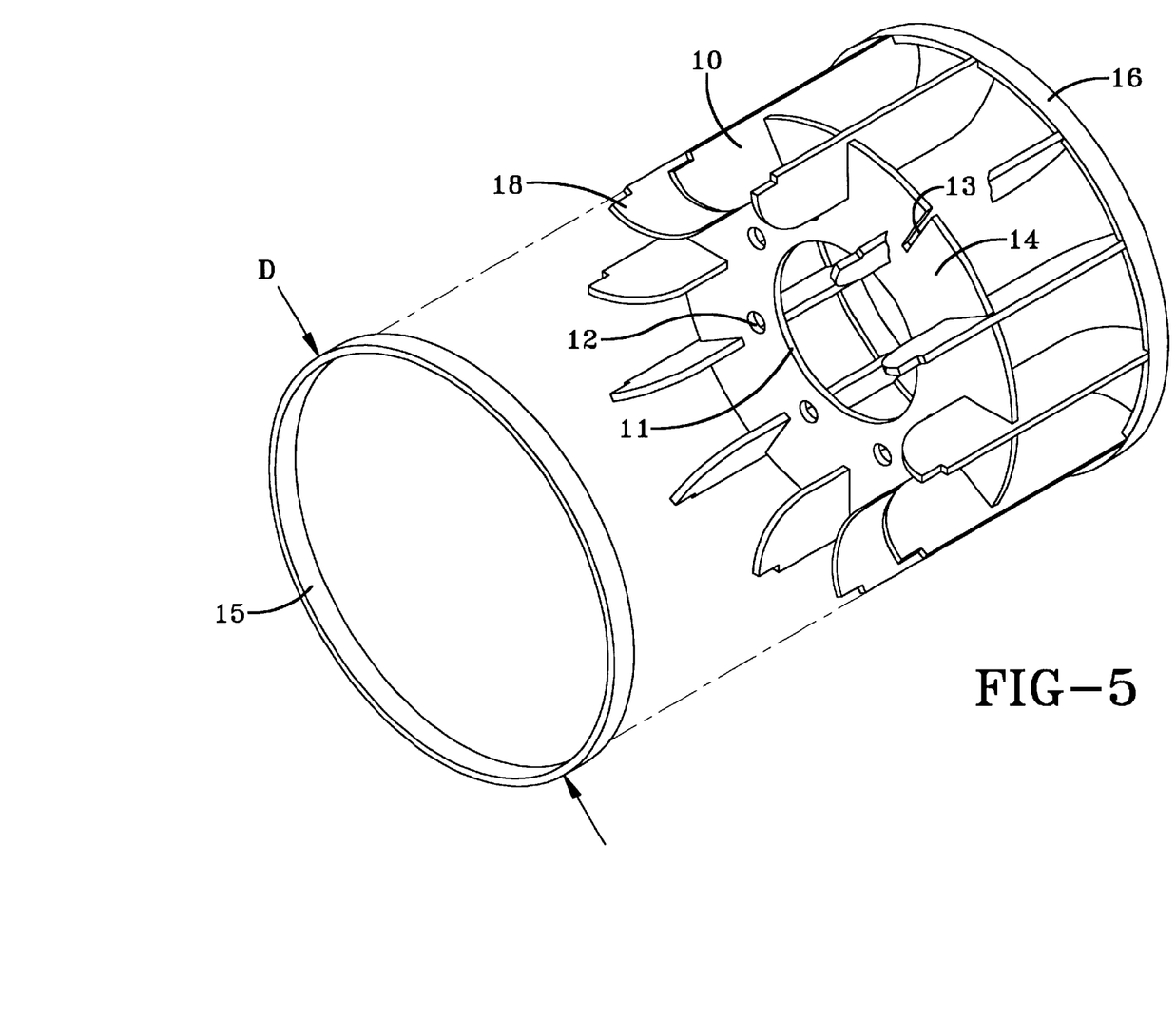
FIG. 5 is a perspective view of the central portion of the rim assembly depicting the laterally extending spokes, the central disk and a pair of annular bands for attaching to the rims.

With reference to FIGS. 3, 4 and 5 instead of using a cylindrical central portion 5, a plurality of spokes 10 are used. Each spoke 10 is spaced a sufficiently large distance apart to permit rocks and debris to pass through adjacent spokes 10 to be ultimately tossed out of the wheel assembly 4.

Ideally the spokes are evenly located on 30° to 45° increments around the wheel. Less space is technically feasible, however, the opening at the radially inner portion of the adjacent spokes 10 must be sufficiently large to allow debris to easily pass.

The central disk 14 as shown preferably has slotted openings 13. Prior to assembly to the rims 6, the spokes 10 are fitted into these slots 13 and welded or otherwise permanently fixed to the disk 14.

An important feature of the slotted disk 14 is that it establishes the location of and the amount of wheel offset O. The wheel offset O of particular track vehicles varies such that the clearance needed for one vehicle manufacture or type mary be different than another vehicles of a different manufacture. The present invention enables the disk to be welded to the spokes 10 after the exact mounting specification is established for the vehicle application. Unlike prior art wheel assemblies, this means no special spacer adapters will be required. Each rim is precisely made for its intended vehicle.

The circumferential offset O is established by measuring the distance halfway between the pair of annular rim 6 (as shown this is the centerline (CL) between the rim pairs) and then measuring the distance from the centerline (CL) and the planar surface of the central disk 14 that will abut the vehicle hub.

As shown in FIG. 5, the central portion preferably includes spokes 10, the slotted disk 14 and a pair of continuous annular bands 15,16. Each band 15,16 preferably fits over and abuts into a cut out notch 18 on each lateral end of a spoke 10. Preferably, each spoke is welded or otherwise permanently secured to the inner surface of the bands 15,16. Each band has an outside diameter D that is designed to fit the inside diameter of the annular rim 6. The bands 15,16 are preferably welded to or otherwise permanently attached to the rims 6. As can be easily appreciated the circumferential welding of each band around the interior of the rim achieves a very high torque capable wheel assembly 4.

As in the prior art, the central disk 14 has an opening 11 for the axle and smaller openings 12 for the attachment to the vehicle hub.

The central portion when assembled and welded has a very high torsional rigidity due in fact to the width (W) of each spoke 10. The thickness (t) each spoke is also designed to insure sufficient strength. Each spoke is preferably made of steel and is preferably at least ¼ inch thick and about 6 inches wide.

At the lateral extremes the bands 15,16 are also steel and about $\frac{1}{8}^{th}$ inch thick and about one to two inches wide preferably. Each annular rim is about $\frac{9}{32}^{nd}$ thick. The combined thickness at the rim to band interface is increased to about 50% greater than a standard rim and the assembly 8 yields a strength at least equivalent to the solid tubular disk 5 of the prior art.

Figure 6:
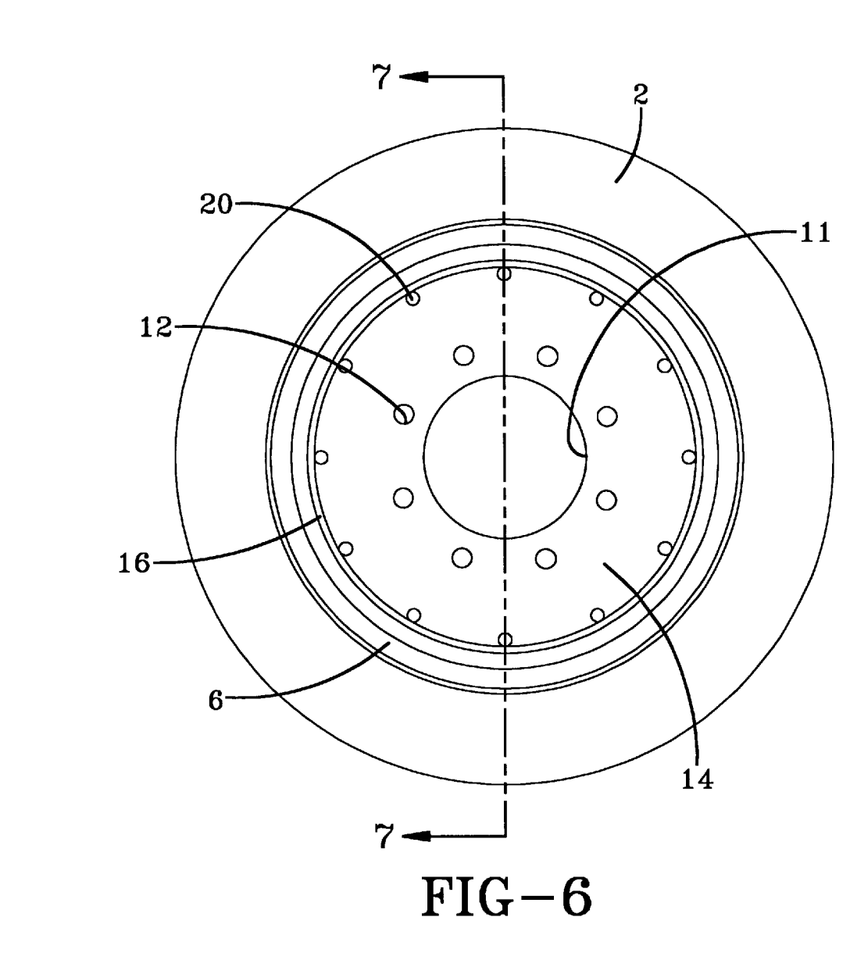
FIG. 6 is a side elevational view of a second embodiment wheel assembly of the present invention.
Figure 7:
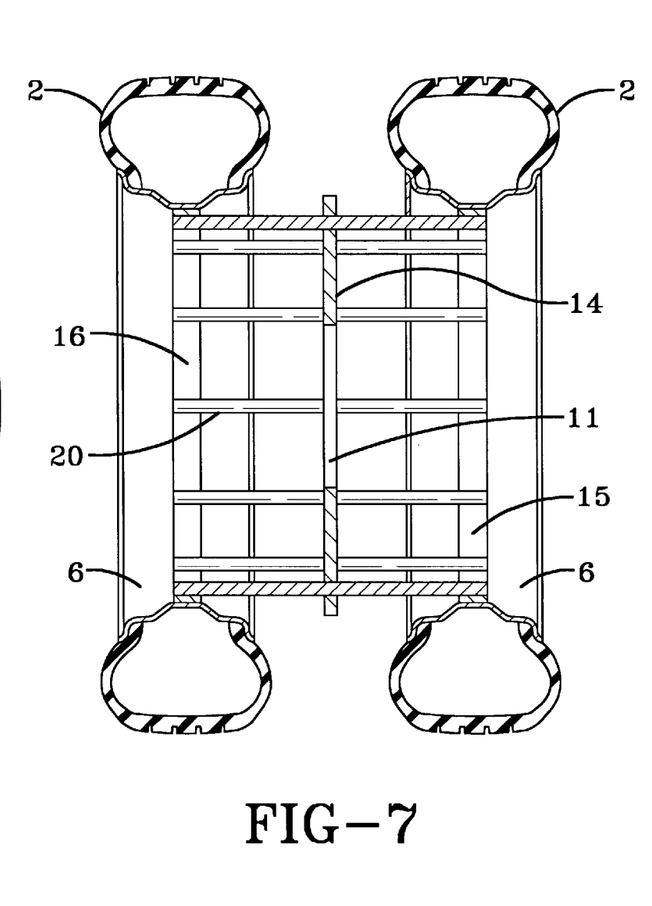
FIG. 7 is a cross-sectional view of the second embodiment wheel assembly of the present invention.
Figure 8:
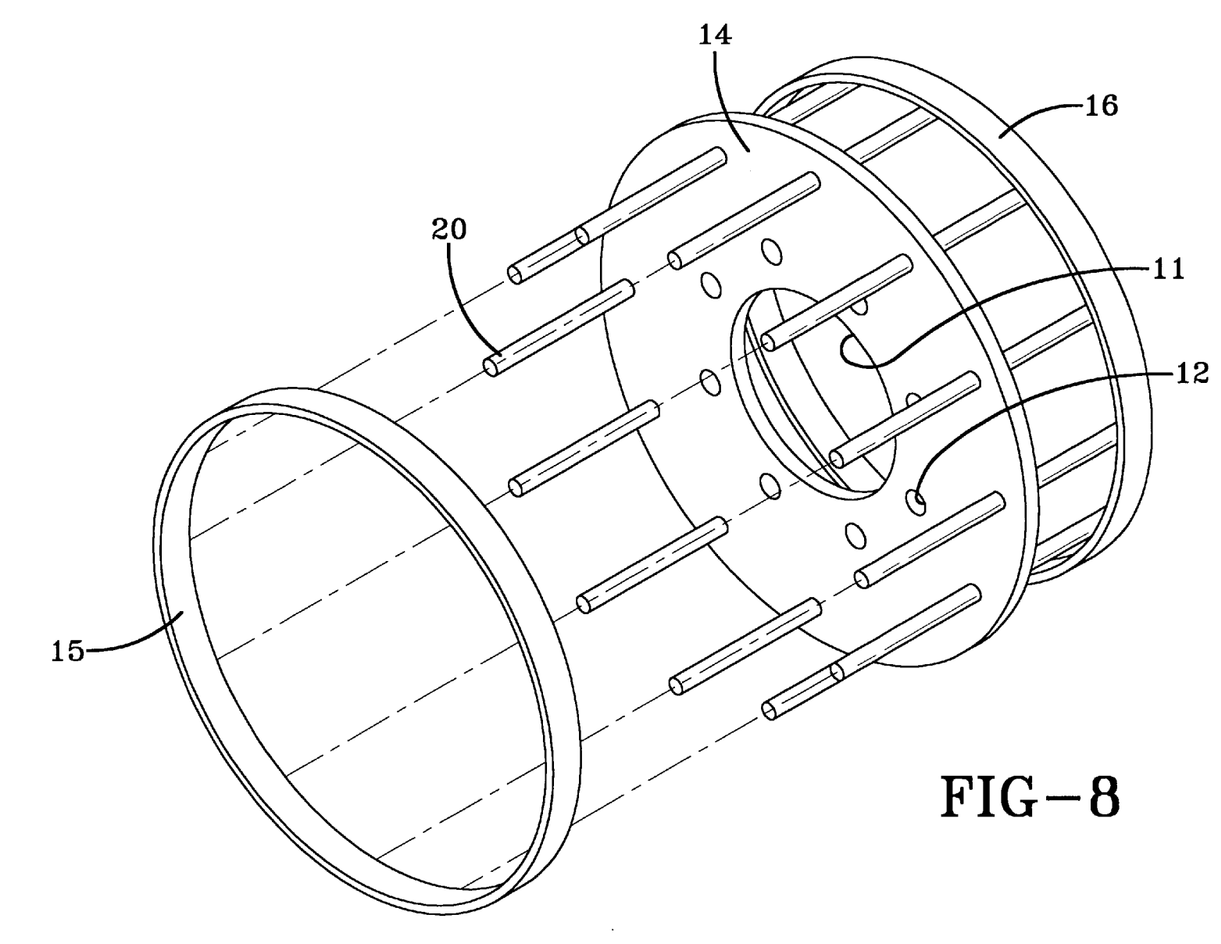
FIG. 8 is a perspective view of the second embodiment's central portion.

In FIGS. 6, 7 and 8 a second alternative design is shown wherein large steel rods 20 used as the laterally extending spokes. While these rods provide better opening for debris removal, they sacrifice spoke torsional rigidity. Accordingly, the rods 20 preferably are increased in size having diameter about 1 inch or more or increased in number such that a spacing of 10°–20° can be used instead of the 30° spacing as illustrated.

Figure 9:
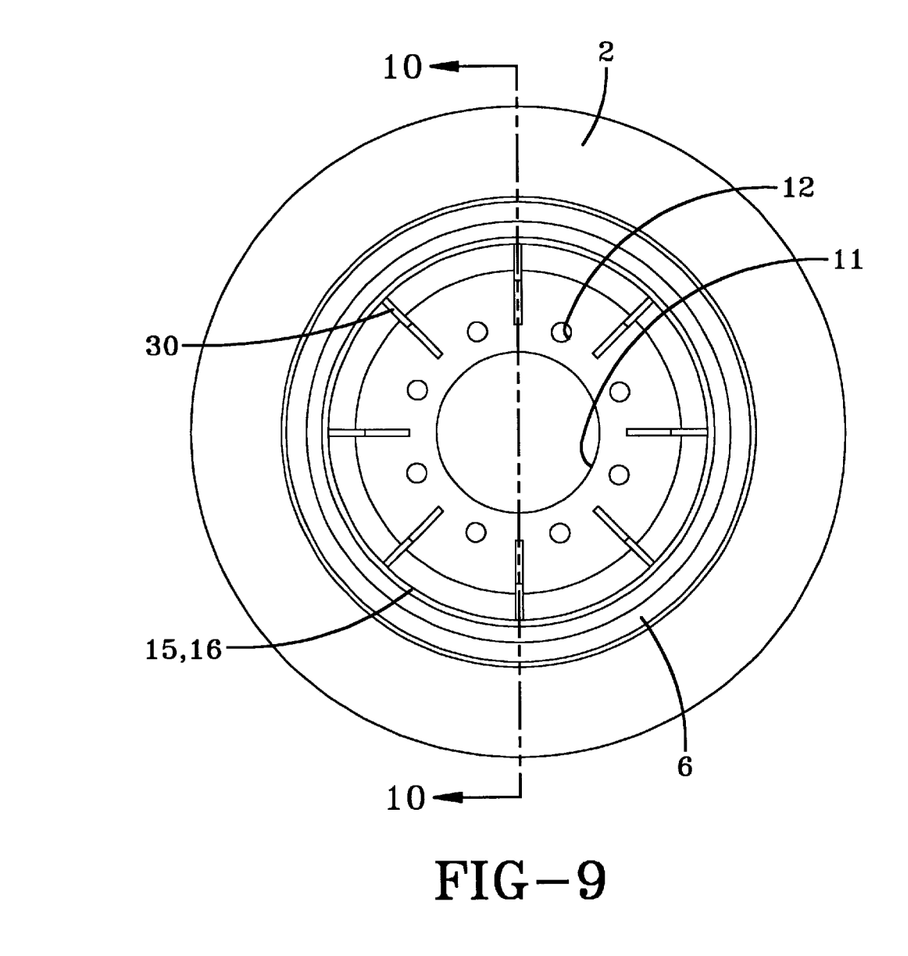
FIG. 9 is a side elevational view of the third embodiment wheel assembly of the present invention.
Figure 10:
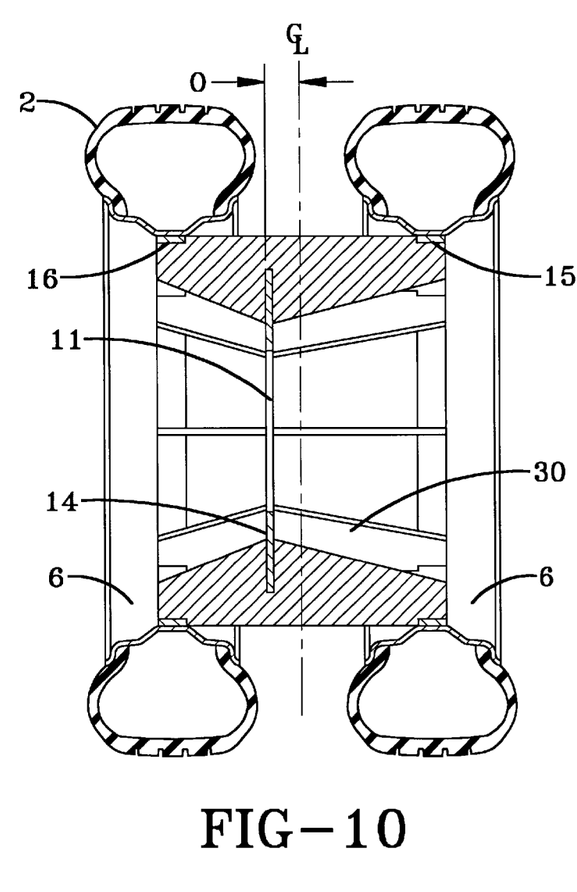
FIG. 10 is a cross-sectional view of the third embodiment wheel assembly of the present invention.
Figure 11:
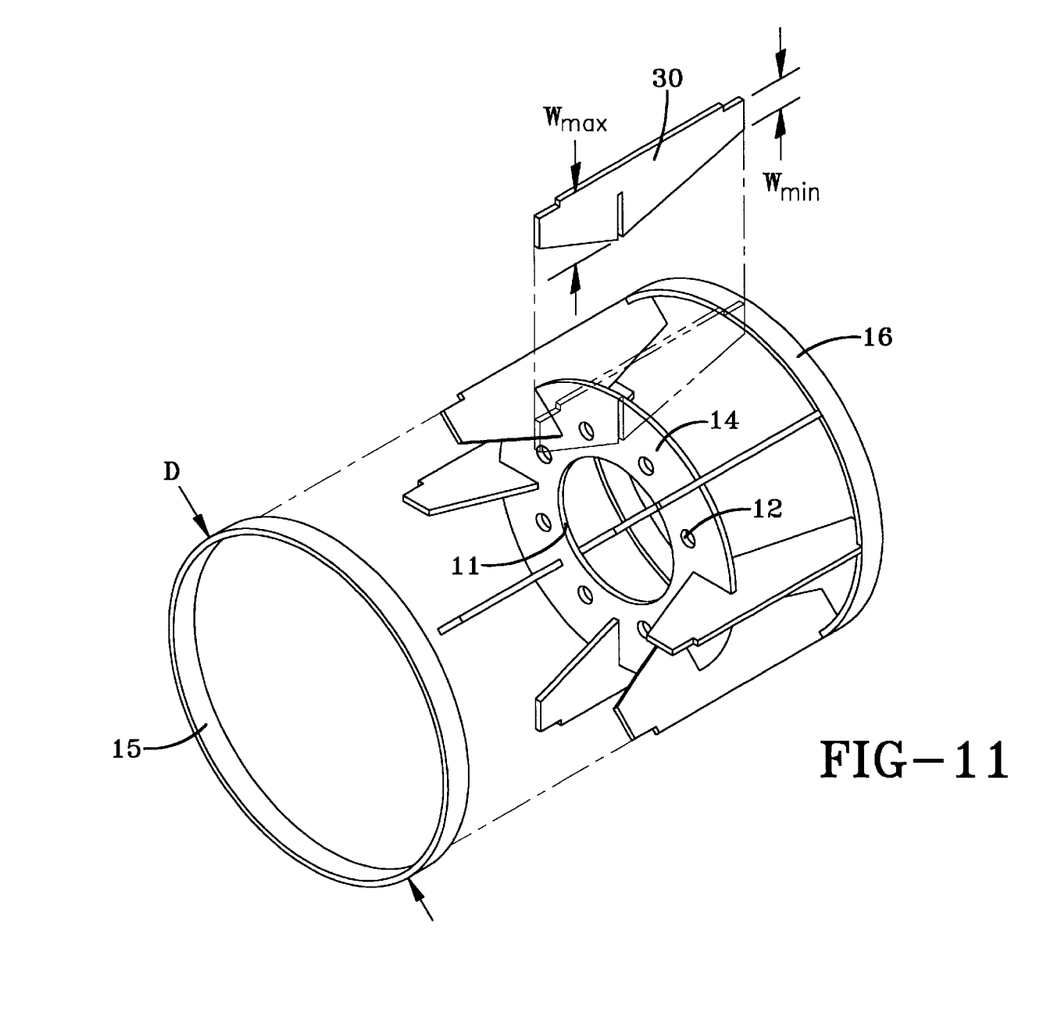
FIG. 11 is a perspective view of the third embodiment's central portion.
Figure 12A:
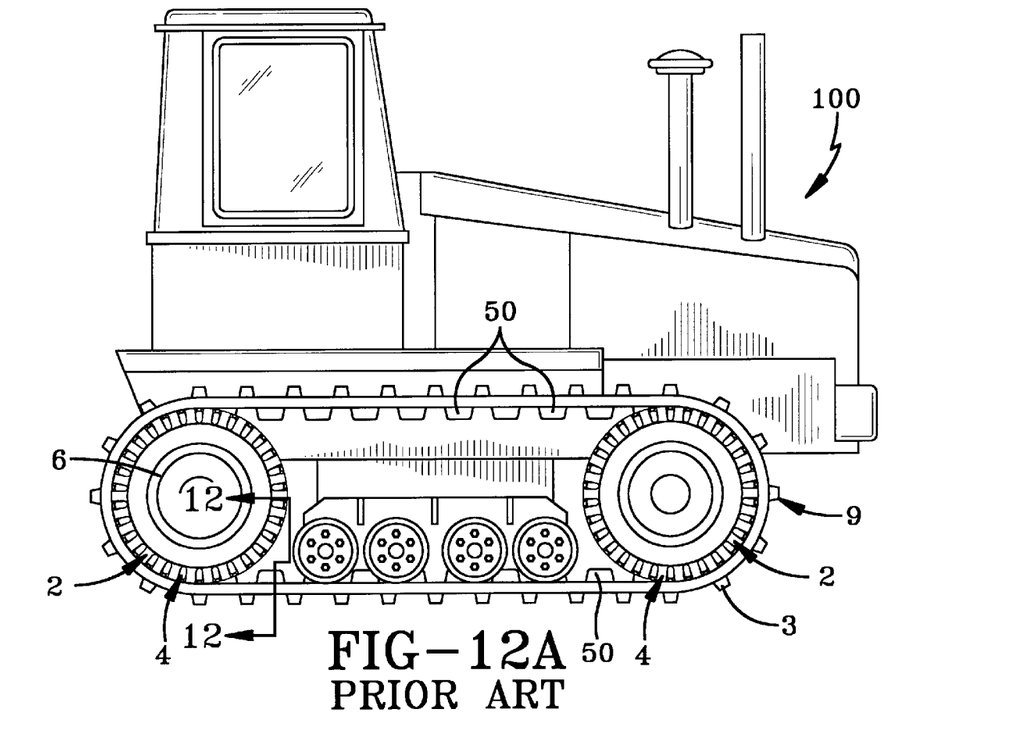
FIG. 12A is a side view of track vehicle.
Figure 12B:
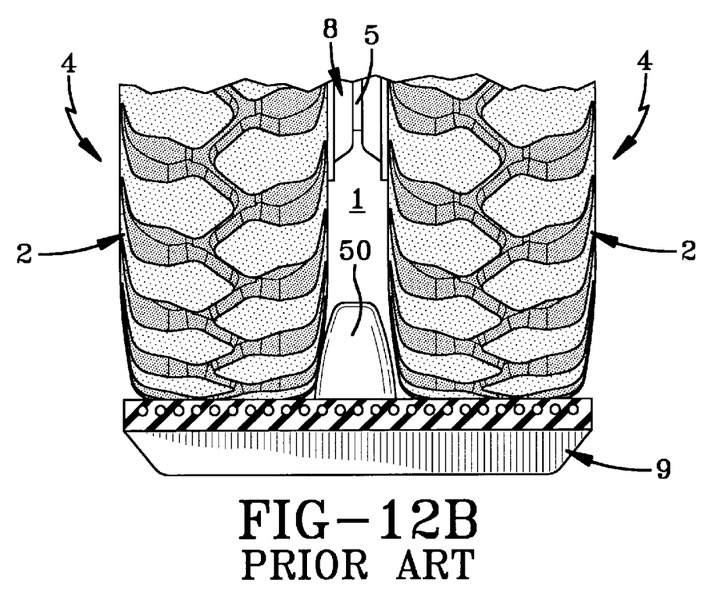
FIG. 12B is a cross-section of the track and wheel assembly as taken along lines 12.

In FIGS. 9, 10 and 11, an alternative third embodiment is shown illustrating spokes 30.

As shown, each spoke 30 is slotted and adapted to fit onto a central disk 24. The spoke 30 has a sloping radially inner portion having a maximum width W, max at the location of the disk 14 and a minimum width W min at the lateral extremes. This configuration is believed to be most preferable for rigidity.

An important feature of all these concepts is that the spokes are not required to contact the inner drive lugs 5 of the track 9. This is unlike most solid drive steel tracks. This feature enables the wheel rim assembly to slip relative to the track should a large obstructing rock get trapped. This feature alone would, in most cases, prevent track or rim damage.

Prior art steel track designs are far less forgiving in that any obstruction would either lock up the track or worse, bend the drive spokes or inner track gearing.

By effectively decoupling the rim 4 from the drive lugs 50 of the track 9, in a worst case the present invention will exhibit a slight track slippage until the debris gets pushed through the gap in the spokes 10,20 or 30.

While certain representative embodiments and details have been shown for the purpose of illustrating the invention, it will be apparent to those skilled in this art that various changes and modifications may be made therein without departing from the spirit or scope of the invention.

What is claimed is:

1. A dual pneumatic tire rim assembly having a pair of annular rims for mounting a pair of pneumatic tires for a tracked vehicle; the rim assembly characterized by:

a plurality of laterally extending spokes separating each annular rim by a fixed distance, each spoke being rigidly fixed relative to each rim;

a central disk extending radially inwardly and being located between the pair of annular rims at a fixed distance that is offset from a centerline (CL) between the pair of annular rims to the central disk; and a pair of annular bands, each band being rigidly fixed to lateral ends of the plurality of spokes and being rigidly fixed to an inside diameter of a rim.

* * * * *